United States Patent [19]

Uchida

[11] Patent Number: 4,532,720

[45] Date of Patent: Aug. 6, 1985

[54] DRYING PROCESS AND ITS APPARATUS UTILIZING A REFRIGERATION CYCLE

[75] Inventor: Shiichiro Uchida, Fujisawa, Japan

[73] Assignee: Shonetsugaku Kenkyusho Co., Ltd., Tokyo, Japan

[21] Appl. No.: 541,035

[22] Filed: Oct. 12, 1983

[30] Foreign Application Priority Data

Nov. 2, 1982 [JP] Japan ................. 57-193072

[51] Int. Cl.³ .............................................. F26B 3/00
[52] U.S. Cl. ......................................... 34/27; 34/32; 34/77
[58] Field of Search ...................... 34/27, 32, 219, 77

[56] References Cited

U.S. PATENT DOCUMENTS

| | | | |
|---|---|---|---|
| 2,392,405 | 1/1946 | Phipps | 34/27 |
| 2,418,239 | 4/1947 | Smith | 34/77 |
| 3,190,011 | 6/1965 | Shields | 34/77 |
| 4,205,456 | 6/1980 | Ayers et al. | 34/77 |
| 4,250,629 | 2/1981 | Lewis | 34/77 |
| 4,370,816 | 2/1983 | Zambelli | 34/77 |
| 4,447,965 | 5/1984 | Bray | 34/27 |

FOREIGN PATENT DOCUMENTS

| | | | |
|---|---|---|---|
| 2304045 | 11/1976 | France | 34/77 |
| 36067 | 4/1978 | Japan | 34/77 |

Primary Examiner—Edward G. Favors
Assistant Examiner—Steven E. Warner
Attorney, Agent, or Firm—Oblon, Fisher, Spivak, McClelland & Maier

[57] ABSTRACT

A drying process and its apparatus utilizing a refrigeration cycle. The drying apparatus is constructed to interpose a heat exchanger between an evaporator and a heater so that air in a drying chamber may be dried and heated in a cycle of introducing hot air in the drying chamber into the heat exchanger to pre-cool hot air, guiding pre-cooled air to the evaporator to dry it due to dehumidification by cooling, introducing cooled and dried air into the heat exchanger again to increase the temperature, introducing the air to the heater to further heat it and returning dried and heated air to the interior of the drying chamber.

1 Claim, 9 Drawing Figures

DRYING PROCESS AND ITS APPARATUS UTILIZING A REFRIGERATION CYCLE

BACKGROUND OF THE INVENTION

1. Field of the Invention

This invention relates in general to a drying process and its apparatus adapted for use in drying grain, agricultural products, marine products, wood and the like efficiently with a relatively high temperature.

2. Description of the Prior Art

Recently, a refrigeration system has been widely used in an apparatus for drying various kinds of products such as rice, wheat, bean, potato, tabacco, herb, sea food, wood and the like taking notice of the fact that it exhibits the excellent ability of effectively drying air due to dehumidification. Such a drying apparatus is constructed in a manner to install the refrigeration system at the interior or exterior of a drying chamber to dehumidify air in the chamber due to cooling and drying, heat dried air using a suitable heating means such as an electric heater, a condenser or the like, and then return dried and heated air to the drying chamber. The utilization of the refrigeration system as a dryer can exhibit excellent dehumidification of air, and the heating of cooled and dried air can be readily effected by means of a heater or the like. However, such a drying system only keeps the drying chamber at a temperature as high as 30° to 40° C. Accordingly, this system is effective to carry out drying at a relatively low temperature of at most 30° to 40° C., because it can withstand continuous service for a long period of time at such low temperature.

However, as a matter of fact, ideal drying of such products as described above must be carried out by successively keeping the products at a higher temperature of approximately 60° to 80° C. for a long period of time. Therefore, the drying system utilizing refrigeration cycle is not suitable for accomplishing effective drying of the products, because the drying temperature is too low.

Such a disadvantage of the conventional drying system may be overcome by using a suitable heating means such as a heater of a larger capacity to heat the drying chamber to a desired temperature of 60° to 80° C. In this case, the drying chamber is readily heated to the desired temperature. However, when air in the drying chamber heated to the high temperature by the heater is introduced into a refrigeration system as it is without limiting the rate of air to be introduced, an evaporator reduces in function of cooling the air, because the temperature of the air is so high beyond the cooling capacity of the evaporator and the high-temperature air which has failed to be cooled is recycled to the condenser to be re-heated. This allows a temperature of the drying chamber to be increased but causes the dehumidification effect of the drying chamber to be substantially decreased. Thus, a compressor is overloaded because of the evaporator being exposed to a high temperature, and the whole refrigeration system is over the limit of its capacity, resulting in power consumption being too large and the refrigerator system being eventually damaged.

In general, some requirements are to be met in order that the refrigeration system may reliably exhibit its performance and effectively carries out continuous service for a long period of time when it is used for drying. In this regard, it is essential to keep air to be introduced into the evaporator at a temperature below approximately 40° C. If not, such disadvantages as described above are created.

More particularly, dehumidification by means of the evaporator can be effectively carried out as the difference between a temperature of air to be introduced therein and the dew point thereof is large. Supposing that air having a temperature of 30° to 40° C. or less introduced into the evaporator is cooled to about 0° to 5° C. which is near the dew point, moisture in air can be efficiently removed, because the temperature difference therebetween is 30° to 35° C. which is large enough to accomplish dehumidification in the evaporator. On the contrary, supposing that air of about 60° to 80° C. is introduced directly into the evaporator and cooled to about 40° C., dehumidification of the air does not substantially occur even if the temperature difference in air is significantly large, because the temperature of cooled air is far above the dew point.

Further, an apparatus for drying products as described above is continuously used day and night extending over a long period of time. It is possible for a conventional drying apparatus utilizing combustion energy of petroleum to carry out such continuous service, however, the use of petroleum causes the running costs to be extremely high. Whereas, a conventional drying apparatus using a refrigeration cycle involves such overload problem as described above and is not suitable for use in industry at all. Accordingly, there is a strong demand for reliable drying process and apparatus which can allow a refrigeration system to be continuously driven for a long period of time while keeping air in a drying chamber without containing products therein at a temperature in the range of about 60° to 80° C.

BRIEF SUMMARY OF THE INVENTION

The present invention has been made in view of the foregoing disadvantage the conventional drying apparatus utilizing refrigeration cycle.

Accordingly, it is an object of the present invention to provide a drying process and its apparatus having novel and excellent characteristics which are capable of carrying out continuous service of a refrigeration system for a long period of time while keeping air in a drying chamber at a high temperature without causing the refrigeration system to be damaged.

It is another object of the present invention to provide a drying process and its apparatus which are capable of allowing all heat energy of a refrigeration system to be utilized in a drying chamber to significantly improve energy saving and substantially decrease the running costs by circulating only air of the drying chamber and discharging only water through a drain pipe to the exterior of the drying chamber for dehumidification purpose without causing any access of air with respect to the exterior.

The present invention has been made taking notice of the fact that a prerequisite for allowing a refrigeration system to effectively act as a dryer continuously for a long period of time within the sphere of its capacity is to prevent an evaporator from being introduced a large amount of air having a high temperature in a drying chamber. More particularly, the present invention is characterized in that air in a drying chamber is cooled to a temperature of about 40° C. or less sufficient to allow a refrigeration system to fully exhibit its ability prior to the introduction of air into an evaporator and the rate of air to be introduced in the evaporator is limited to prevent the evaporator from unlimitedly being introduced a large amount of air in the drying chamber so that the refrigeration system may be continuously driven for a long period of time under the ideal conditions while keeping air in the drying chamber at a high temperature.

Accordingly, in one embodiment of the present invention, a part of air having a temperature of about 80° C. in a drying chamber is limitedly introduced into a heat exchanger interposed between an evaporator and a heater such as a condenser, an electric heater or the like through an intake thereof to be pre-cooled to a temperature of about 35° to 10° C. by heat exchange. Then, the pre-cooled air is introduced into the evaporator to be further cooled to a temperature of about 15° to 5° C. to be dried due to dehumidification, which is, in turn, returned to the heat exchanger to be subjected to heat exchange again. According to the present invention, the heat exchange can be carried out between high-temperature air in the drying chamber and air cooled by the evaporator to cool the former air and to heat the latter air. As a result, hot air in the drying chamber to be introduced into the evaporator is cooled to an appropriate temperature.

As is apparent from the foregoing, a principal object of the present invention is to carry out continuous drying operation for a long period of time while keeping the drying chamber at a high temperature of about 60° to 80° C. However, it is a matter of course that the present invention is capable of carrying out continuous drying operation at a low temperature of about 5° to 15° C. and a normal temperature of about 15° to 40° C. as the conventional drying system. The continuous drying operation at such a low or normal temperature can be accomplished by only an interaction between an evaporator and a heat exchanger without using any heater. However, any suitable heater such as a condenser, an electric heater or the like may be used so as to effect close temperature control. In this instance, the heater may be installed in a dehumidifying and heating unit or in other suitable place, for example, in the interior of the drying chamber.

DETAILED DESCRIPTION OF THE PREFERRED EMBODIMENTS

The invention will be described with reference to the accompanying drawings, in which like reference numerals identify like elements of structure in each of several figures.

Figure 1:
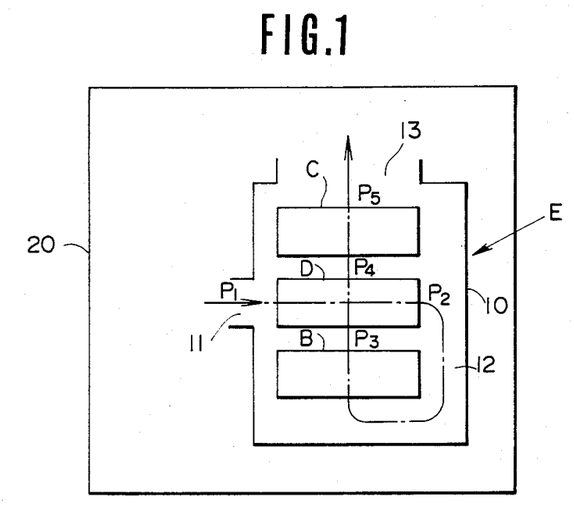
FIG. 1 is a schematic view showing a drying system according to the present invention.

The present invention is directed to a drying system which is adapted to carry out dehumidification of air in the drying chamber having articles stored therein to dry using any one of various conventional refrigeration systems such as a compression refrigeration system, an absorption refrigeration system and the like. Referring to FIG. 1 showing a drying system of the present invention, the system comprises a compressor A, an evaporator B and a heater C such as a condenser, an electric heater, a combination thereof or the like.

Figure 3:
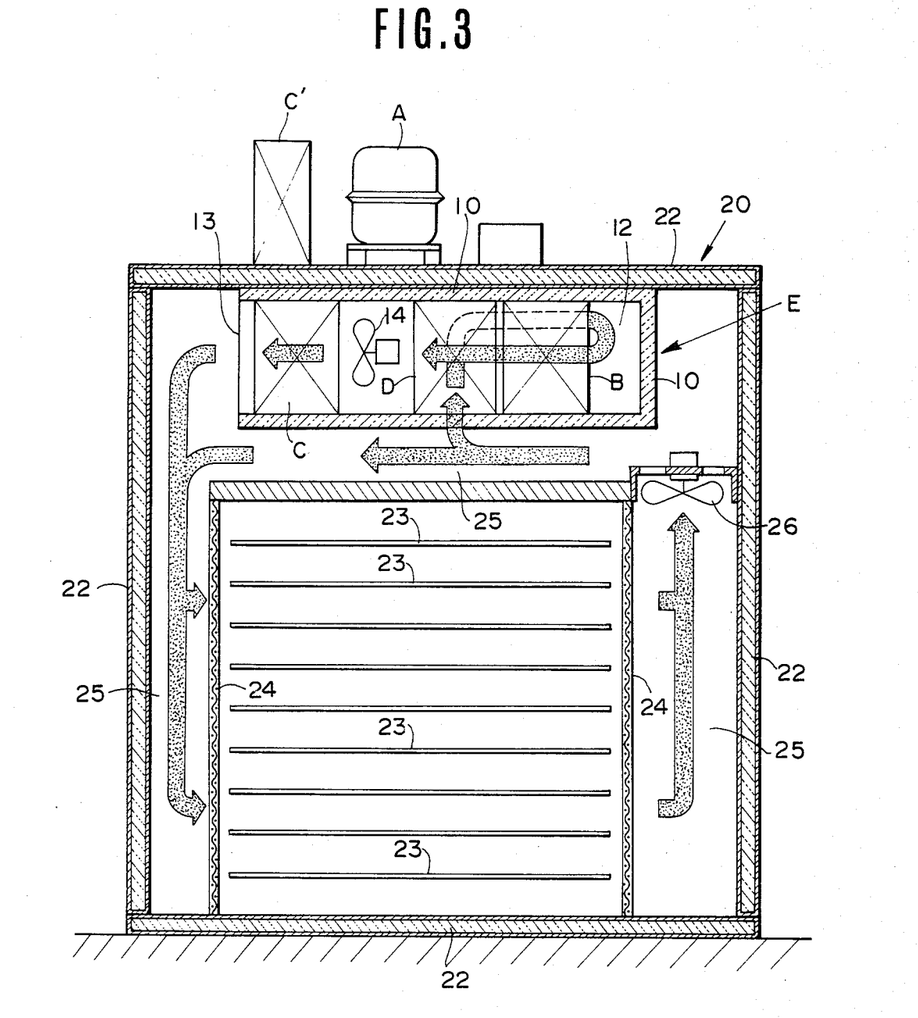
FIG. 3 is a vertical sectional elevation view of a drying apparatus according to an embodiment of the present invention.

As shown in FIG. 1, the evaporator B and heater C are arranged in a heat-insulating housing 10 so as to space from each other at a suitable interval, and a suitable heat exchanger D is disposed between the evaporator B and the heater C. The housing 10 is provided with an air inlet 11 at a wall thereof facing one side of the heat exchanger D and is formed with an air passage 12 therein which extends from the other side of the heat exchanger to the front side of the evaporator B along the walls of the housing 10. The housing 10 also has an air outlet 13 provided at the rear of the heater C. The dehumidifying and heating unit E thus formed is installed at the interior or exterior of a heat-insulating drying chamber 20 which is constructed by a heat-insulating panel 22 having an entrance door 21 as shown in FIG. 3. In the embodiment of FIG. 3, a part of air in the drying chamber is repeatedly circulated in a flow path which starts at the interior of the drying chamber 20 following to the inlet 11, heat exchanger D, passage 12, evaporator B, heat exchanger D, heater C, outlet 13 and the interior of the chamber 20, to thereby carry out drying of the articles stored in the chamber 20. The circulation of air is conveniently carried out by means of a suitable suction fan or blower 14 provided between the heat exchanger D and the heater C.

The circulation of air in the path described above allows the interior of the drying chamber to be elevated to a desired temperature of, for example, 60° to 80° C. The heated air in the chamber 20 is subjected to heat exchange for the cooled and dried air introduced through the evaporator B into the heat exchanger D to be pre-cooled to a temperature suitable for allowing the refrigeration system to fully exhibit its capacity, for example, about 35° to 25° C. The pre-cooled air is then introduced to the evaporator B to be further cooled to a temperature of about 15° to 5° C. for the purpose of drying due to dehumidification. Then, the cooled air is returned to the heat exchanger D, in which heat exchange takes place between the cooled air and hot air newly introduced thereinto from the interior of the drying chamber to heat the cooled air to a temperature of about 35° to 50° C. Finally, the heated air is guided to the heater C such as a condenser, an electric heater or the like to be further heated to about 60° to 80° C. which is a desired temperature of the drying chamber 20 and returned to the interior of the drying chamber to be used for drying the articles.

Figure 2:
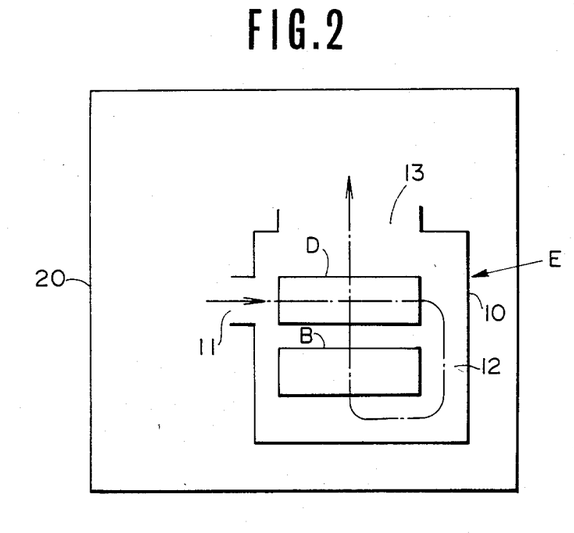
FIG. 2 is a schematic view showing a modification of a drying system according to the present invention.

The condenser C used as a heater in FIGS. 1, 2 and 3 is not required to be provided in the dehumidifying and heating unit E when the drying is carried out at a low temperature or a normal temperature. In this instance, the condenser C may be installed at a suitable place in the interior or exterior of the drying chamber to return air heated due to heat exchange in the heat exchanger D directly to the interior of the drying chamber without introducing it to the heater.

Figure 4:
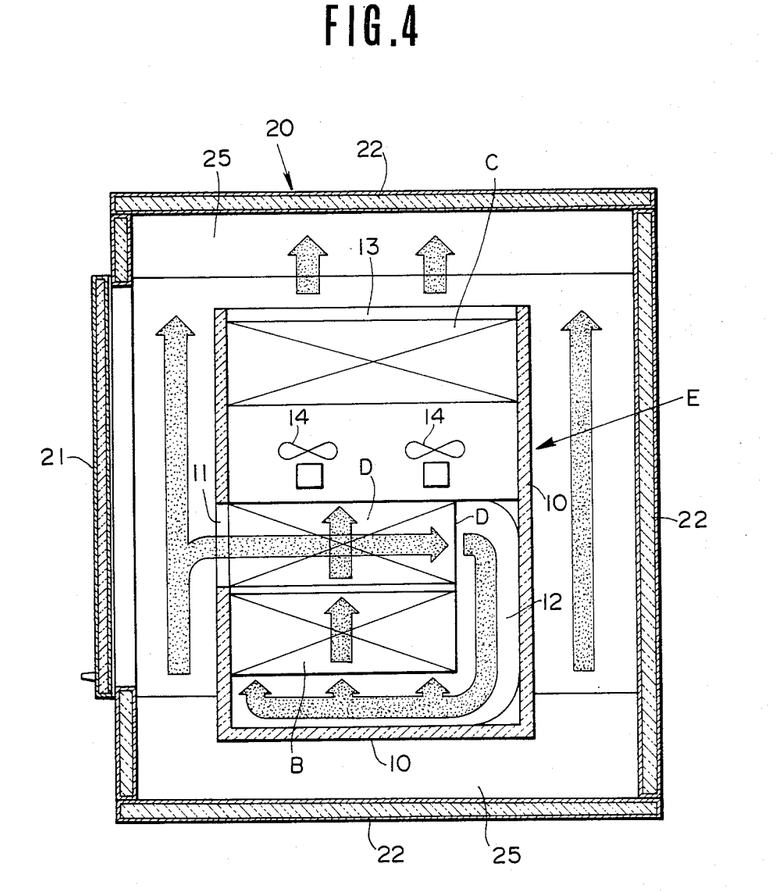
FIG. 4 is a plan view of the drying apparatus shown in FIG. 3 wherein a top plate is removed therefrom.

In the embodiment shown in FIGS. 3 and 4, the unit E is arranged at a ceiling of the drying chamber 20. However, it may be installed at the outside of the chamber 20, for example, on the top wall or side wall of the chamber. Also, it may be installed separate from the drying chamber so far as the inlet 11 and outlet 13 are communicated with the interior of the chamber 20.

Other components of the refrigeration system, for example, a compressor A, a receiver tank and an accumulator in a compression refrigerating machine, an auxiliary condenser C' and the like are arranged at appropriate places such as the ceiling of the chamber 20 in the proximity of the unit E.

The term "evaporator" B used herein implies the cooler portion of any suitable refrigeration system such as an evaporator, a cooling coil, a cooling pipe, a unit cooler or the like used in various refrigeration systems which include a compression refrigerating machine, an absorption refrigeration machine and the like. Thus, it may be replaced with the term "cooler".

Figure 5:
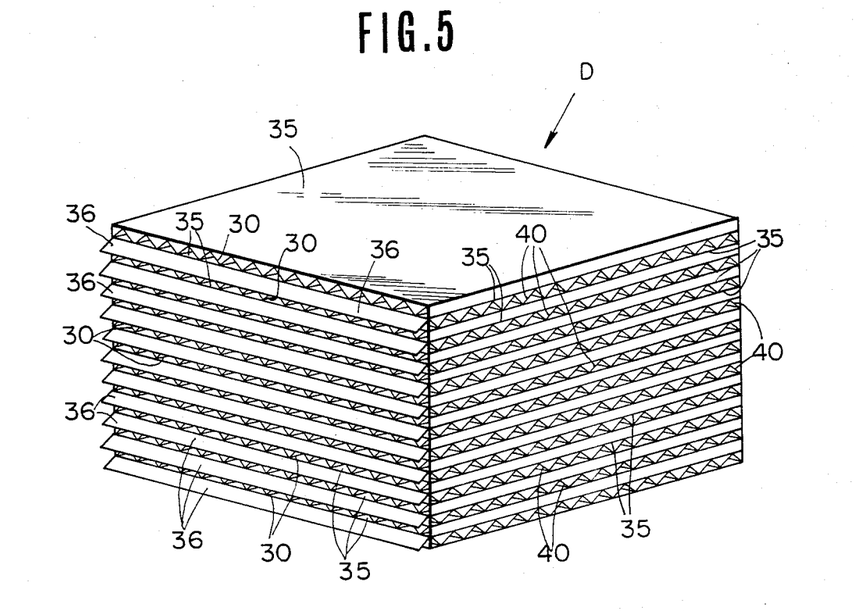
FIG. 5 is a perspective view of a heat exchanger employed in a drying system according to an embodiment of the present invention.
Figure 6:
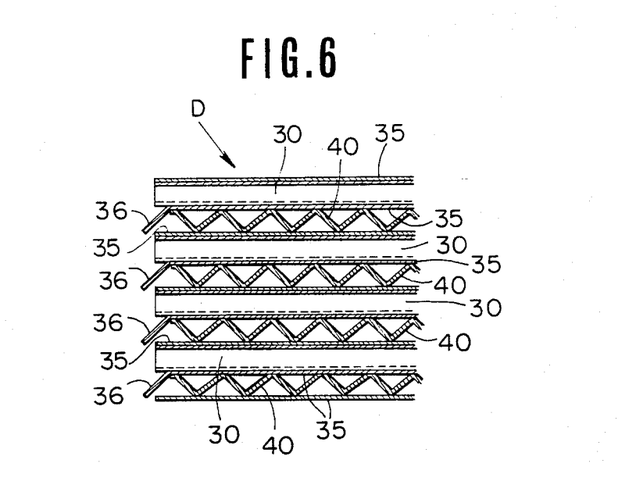
FIG. 6 is a partly enlarged sectional view of the heat exchanger shown in FIG. 5.

As explained hereinabove, the heat exchanger D merely acts to carry out heat exchange between hot air to be introduced from the inlet 11 therethrough to the evaporator B and cooled air which has been passed through the evaporator B. Therefore, a heat exchanger of a conventional structure may be used as the heat exchanger D. The heat exchanger may be constructed as desired, for example, in such a rectangular block shape as shown in FIGS. 5 AND 6. The heat exchanger D shown in FIGS. 5 and 6 comprises a plurality of thin corrugated aluminum sheets 30 and 40 arranged in parallel with one another at small intervals and in a relationship laminated in an alternately perpendicular with each other by means of flat partition plates 35 interposed between the respective adjacent two sheet 30 and 40. Reference numeral 36 designates a drainage formed by obliquely downwardly bending the projecting end of each of the flat partition plates 35, which acts to allow water droplet produced by cooling due to heat exchange to successfully drop without choking up air inlets provided at the lower portion of the heat exchanger.

Reference character C' (FIG. 3) designates an auxiliary condenser installed on the outside of the unit E as desired, which acts to substantially cover a shortage of the condensation capacity of the refrigerator in the case that the condenser provided in the unit E mainly serves to heat air. Also, in the drying system of the present embodiment, it is preferable to enclose shelves 23 on which to place articles to be dried with a suitable vent means such as a mesh structure 24 to form an airway 25 in the drying chamber 20 and install an air circulator such as a fan 26 in the chamber so that dried air of a high temperature may be uniformly circulated in the whole chamber to evenly contact the articles so as to carry out uniform drying of the articles.

Figure 7:
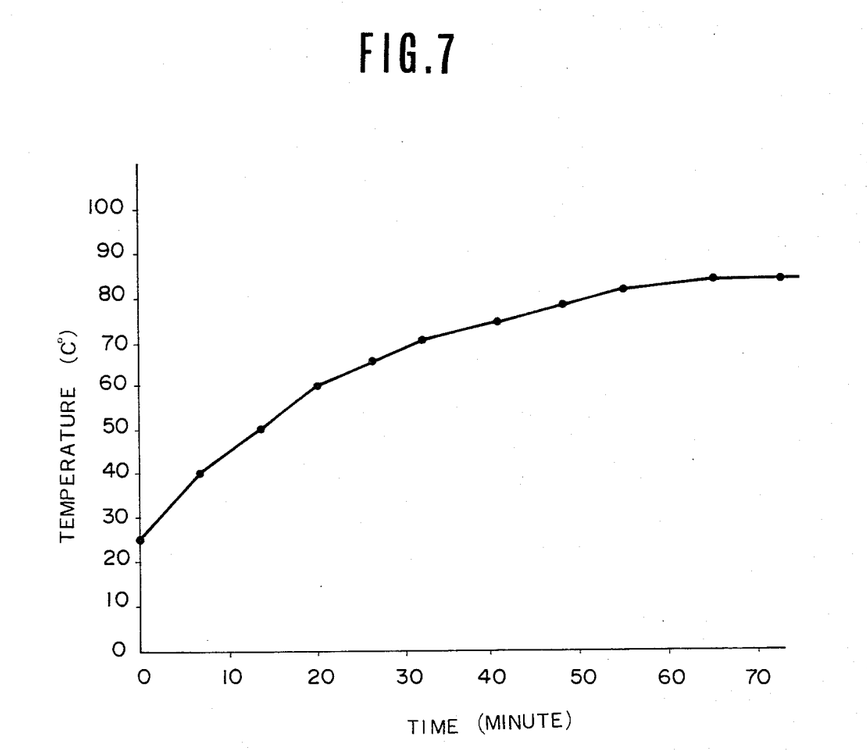
FIG. 7 is a graph showing relationship between temperature rise within a drying chamber and time required to elevate the temperature.

FIG. 7 is a graph showing relationship between temperature rise within the drying chamber 20 and time required to elevate the temperature when the refrigeration system having an output of 2 Hp and operating at AC 200 V is installed in the drying chamber 20 of approximately 4.3 m$^3$ in volume and is operated without containing any article within the drying chamber 20. As is apparent from FIG. 7, the temperature within the drying chamber 20 goes up to 80° C. from a normal temperature of approximately 25° C. in one hour or less and maintains a temperature of approximately 80° to 85° C. thereafter. In this experiment, the refrigeration system is not at all adversely affected by the continuous operation of the refrigeration system for more than ten days maintaing the temperature within the drying chamber 20 at approximately 80° to 85° C.

Figure 8:
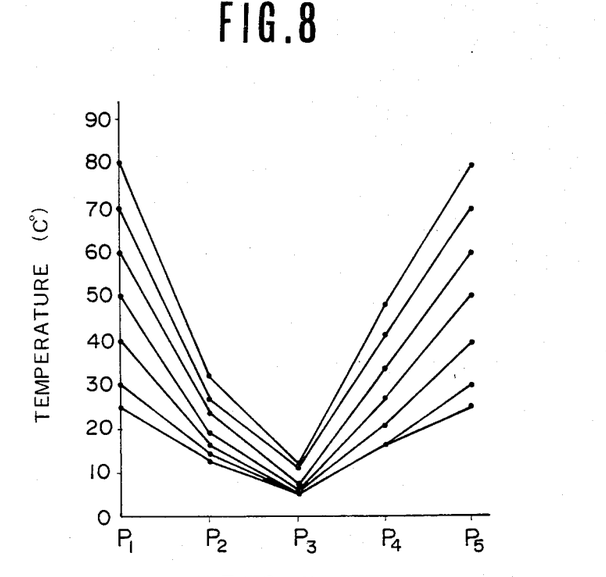
FIG. 8 is a graph showing temperature variation of air within a dehumidifying and heating unit.

FIG. 8 is a graph showing variation in temperature within the dehumidifying and heating unit E in the drying chamber 20. In the graph, the ordinate represents the temperature, while the abscissa represents each of the positions $P_1$ through $P_5$ of the dehumidifying and heating unit E shown in FIG. 1.

Figure 9:
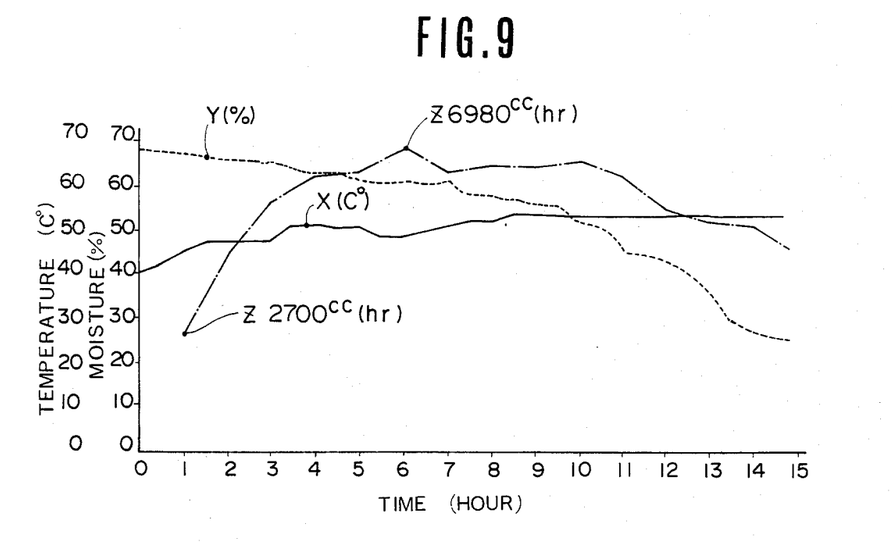
FIG. 9 is a graph showing variations of temperature and humidity in the drying chamber and also amount of drain water to be discharged from the drying chamber as a function of time when test blanket pieces soaked in water are dried by using the drying apparatus of the present invention.

FIG. 9 is a diagram showing temperature X and humidity Y within the drying chamber 20 and also amount of drain water Z discharged outside the drying chamber 20 from a drain pipe due to the dehumidication by cooling using the evaporator B and the heat exchanger D as a function of time. These characteristics are obtained by drying several tens of wet blanket pieces having an area of $10^2$ cm and a weight of 100 Kg including water which are placed evenly on the shelves 23 in the drying chamber 20. The temperature of the air circulating in the chamber 20 heated by the heater C is initially about 80° C., but is cooled down to 40° C. to be contacted to the wet blanket pieces. Then, the temperature is gradually raised to approximately 55° C. after it has passed 15 hours and finally elevated to 70° to 80° C. after 20 hours of operation which makes the blanket pieces to completely dry. As is apparent from the diagram, the humidity within the chamber 20 descreases as the time passes and the drain water of more than 6,000 cc is discharged per hour after 5 to 10 hours of operation.

It will be readily noted from the foregoing that the present invention is capable of effectively repeating the cycle of introducing air of the drying chamber having a temperature suitable for allowing the refrigeration system to reliably carry out continuous service for a long period of time into the evaporator in suitable quantities to efficiently dry air due to dehumidification therein, guiding dried air to the heat exchanger to pre-heat it, introducing dried and pre-heated air to the heater to further heat it to a temperature desired in the drying chamber and returning hot dried air to the drying chamber so that the whole air in the drying chamber is always hot and dried sufficient to effectively dry articles stored in the chamber. Thus, the present invention is very useful to dry various kinds of articles required to be dried at a high temperature over a relatively long period of time and is advantageously applicable to dry agricultural products, marine products, wood, industrial products and the like.

Obviously, many modifications and variations of the present invention are possible in the light of the above teachings. It is therefore to be understood that within the scope of the appended claims, the invention may be practiced otherwise than as specifically described.

What is claimed is:

1. A drying process utilizing a refrigeration cycle comprising the steps of:
    supplying a part of hot air in a heat-insulated drying chamber having articles to be dried stored therein to a heat exchanger using an air suction or supply means to cool said air by heat exchange to between 25° and 35° C.;

cooling said air to between 5° and 15° C. by introducing said air into an evaporator to allow said air to be dried due to dehumidification by cooling;

guiding said dried air to said heat exchanger again to effect heat exchange for allowing said cooled and dried air to be heated by hot air in said drying chamber to between 35° and 50° C.;

introducing said dried air into a heater to further heat said air to a temperature sufficient to maintain a temperature of 60° to 80° C. in said drying chamber; and returning said dried and heated air to said drying chamber;

whereby said articles stored in said drying chamber are dried by air circulation.

* * * * *